N. U. WALKER.
Clay, Cement and Other Pipes for Drains, Flues, &c.
No. 212,072.   Patented Feb. 4, 1879.
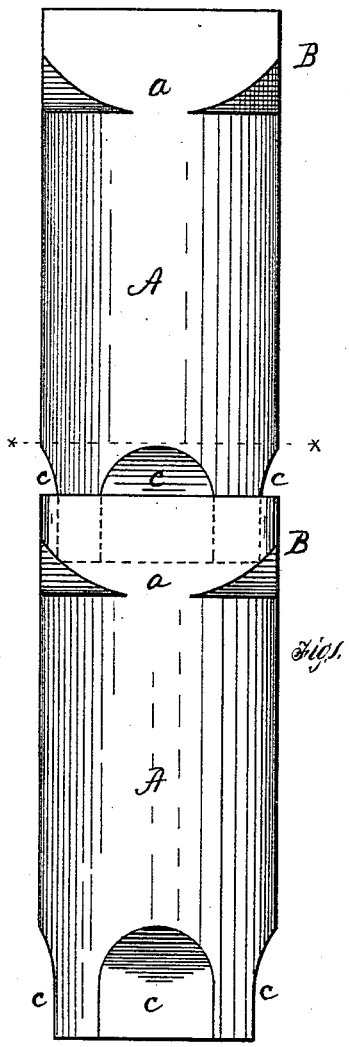
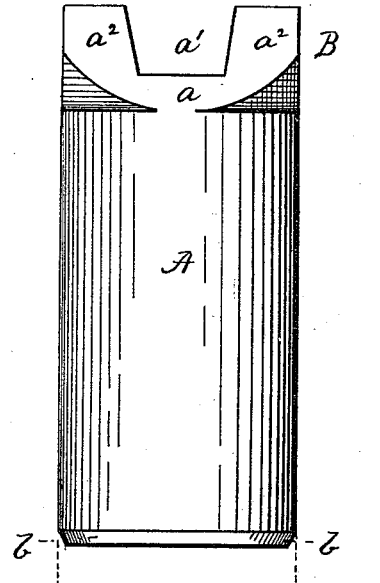
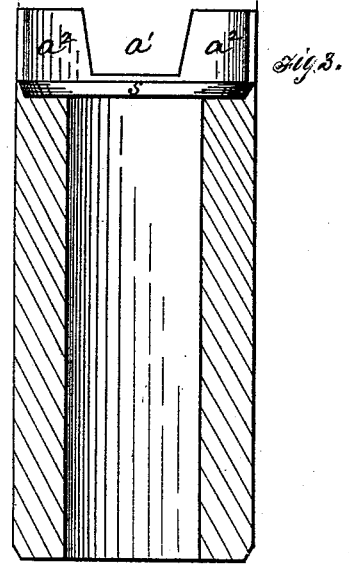
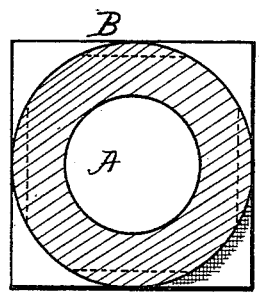
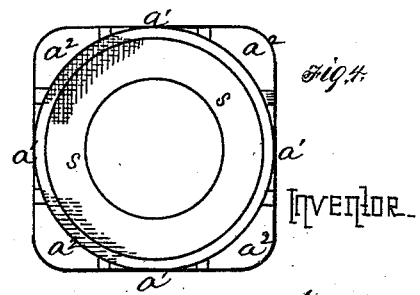
WITNESSES.
L. C. Fitler
John K. Smith
INVENTOR.
Nathan U. Walker
by Bakewell & Kerr
Atty's

UNITED STATES PATENT OFFICE.

NATHAN U. WALKER, OF WELLSVILLE, OHIO.

IMPROVEMENT IN CLAY, CEMENT, AND OTHER PIPES FOR DRAINS, FLUES, &c.

Specification forming part of Letters Patent No. 212,072, dated February 4, 1879; application filed January 2, 1879.

*To all whom it may concern:*

Be it known that I, NATHAN U. WALKER, of Wellsville, in the county of Columbiana and State of Ohio, have invented a new and useful Improvement in Clay, Cement, and other Pipes for Drains, Flues, &c.; and I do hereby declare the following to be a full, clear, and exact description thereof, reference being had to the accompanying drawings, forming part of this specification, in which—

Figure 1 is a side elevation of two sections of pipe joined as when laid. Fig. 2 is a section of one pipe on the line $x\ x$, Fig. 1, and an end view of portions of the bowl of the other pipe. Fig. 3 is a detached view of two sections of pipe, showing a modification, one pipe being in section; and Fig. 4 is an end view of the bowl shown in Fig. 3.

Like letters refer to like parts wherever they occur.

My invention relates generally to the construction of any and all pipes provided with bowls or sockets for coupling the section, whether said pipe or tubing be metallic or of terra-cotta, clay, or cement; and has for its object to obtain a pipe which can be readily built in to form smoke-flues, hot-air flues, ventilating-flues, &c., which can be laid upon flat surfaces, boards, &c., without bringing undue strain on the pipe-bowl, and without liability to change position, as in laying sewers in soft and sandy soil, and which, in the case of terra-cotta, clay, and cement pipes, can be transported without loss from breakage of bowls.

To this end my invention consists in forming the bowl or socket of a pipe so that its sides at one or more points are flush with the pipe, and the sides of the socket are more or less parallel, whereby the pipe, when laid, will bear uniformly upon its support for the entire or the greater part of the length of the pipe, and cannot roll or readily change position.

Heretofore, so far as I am aware, in the formation of almost if not all pipe or tubing provided with a coupling bowl or socket the bowl or socket has projected in form of a ring, so that when the pipe was laid upon its side the projecting ring, bowl, or socket (which is almost invariably weaker than the body of the pipe) was compelled to bear more or less of the weight of the pipe and any superimposed weight, which resulted in frequent loss from breaking of the bowl. In transportation such loss will frequently be as high as ten (10%) per cent. Other objections to pipe with bowls as at present constructed are, first, the difficulty of building them in, as in forming flues in buildings, owing to the tendency of the pipe to change position and the necessity for blocking the pipe by broken brick, cement, &c.; secondly, the necessity when laying sewers of either bedding the pipe or tamping under and around the pipe when laid on firm ground, or the danger of the breaking of pipe or separating of sections from settling when laid in sandy or soft ground.

I will now proceed to describe my invention, so that others skilled in the art to which it appertains may apply the same.

In the drawings, A indicates the body of the pipe, and B the bowl or socket. The bowl or socket B is preferably made with parallel sides $a$, which intersect the pipe at its circumference. The interior of said socket may be either a circle whose diameter corresponds with the diameter of the pipe, as in Figs. 3 and 4, in which case the socket will be cut away, as at $a^1$, and the encompassing portion of the bowl will be four lugs, $a^2$, or the bowl or socket may be continuous, which is preferable, as in Figs. 1 and 2, in which latter case the other end of the pipe will be chamfered or reduced, as at the points $c$, to fit within the bowl or socket B. In order to secure a more perfect joint it is desirable to bevel the end of the pipe, as at $b$, and to form a corresponding slightly-concave seat within the bowl or socket, as at $s$.

The pipe may have continuous sides like the socket or lugs, giving the entire outside a square of polygonal form.

The above constitute two ways of applying my invention, the advantages of which are as follows: First, the shape and construction of the socket or bowl permit flues to be built into walls with accuracy without breaking the brick, and so as to avoid the danger incident to butt-joints. Secondly, in laying sewers it is not necessary to tamp under or bed the pipe to take the weight of the bowls or sockets, and in sandy or soft soil tile or boards may be used to support the pipe. Thirdly, in burning, the sections, being flush in the sides, can be set more permanently and higher in the kiln, thereby preventing rolling or tumbling in burning, and giving the kiln an increased capacity. Finally, in transportation the pipes can be packed to save room without liability to loss by breaking of the bowls or sockets.

I do not herein claim a pipe or tube having a series of lugs projecting from one end, and adapted to receive the reduced end of a second pipe in the manner of a tongue and groove, as in such cases the pipes simply abut, and no socket proper exists.

Having thus set forth the nature and advantages of my invention, what I claim, and desire to secure by Letters Patent, is—

1. A pipe having a socket or bowl the outer surface of which at two or more points is flush with the pipe, and parallel for a greater or less extent, substantially as and for the purpose specified.

2. A pipe having a socket or bowl the outer surface of which at two or more opposite points is substantially parallel and equal in width to the diameter of the pipe, said socket being slotted, substantially as and for the purpose herein specified.

In testimony whereof I, the said NATHAN U. WALKER, have hereunto set my hand.

NATHAN U. WALKER.

Witnesses:
R. H. WHITTLESEY,
J. K. SMITH.